Nov. 27, 1951     R. E. WOLF     2,576,868
TRACTION ATTACHMENT FOR VEHICLE WHEELS
Filed Aug. 3, 1946     2 SHEETS—SHEET 1
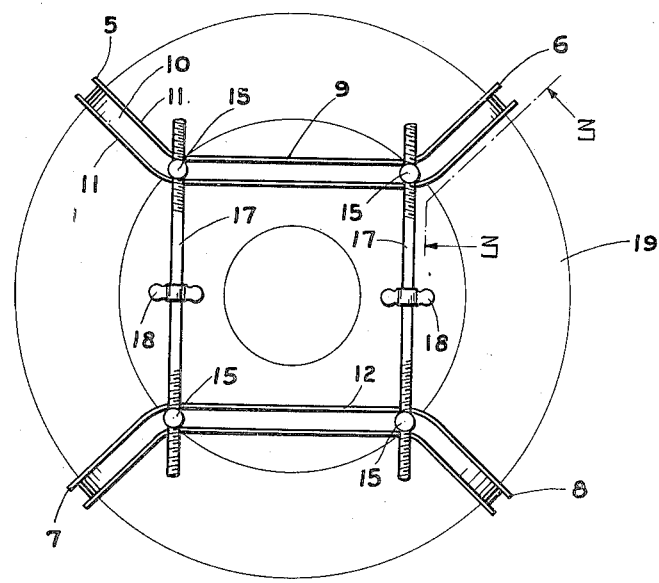
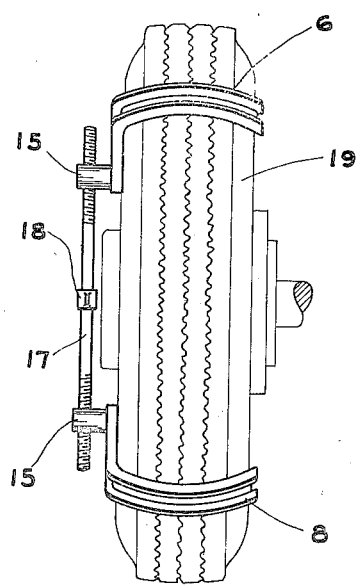
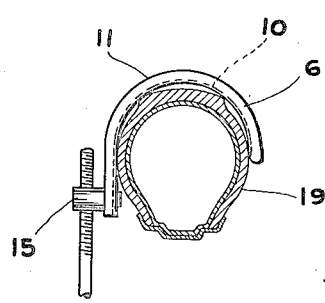
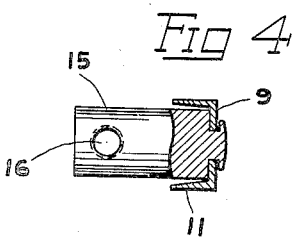
INVENTOR
ROBERT E. WOLF
BY
Wheeler, Wheeler & Wheeler
ATTORNEYS Nov. 27, 1951  R. E. WOLF  2,576,868
TRACTION ATTACHMENT FOR VEHICLE WHEELS
Filed Aug. 3, 1946  2 SHEETS—SHEET 2
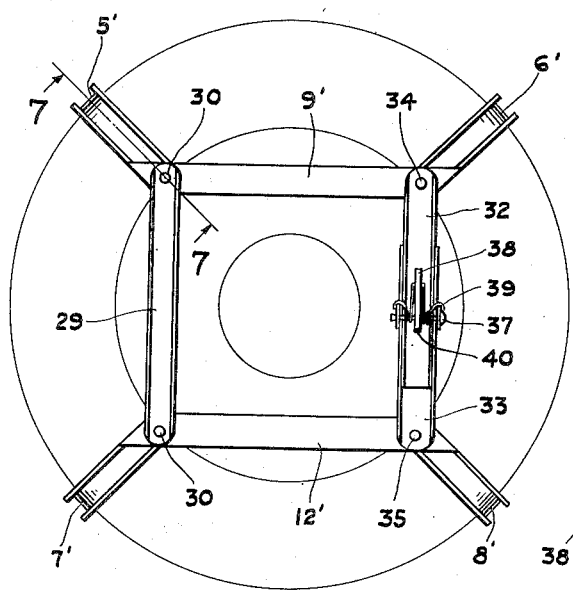
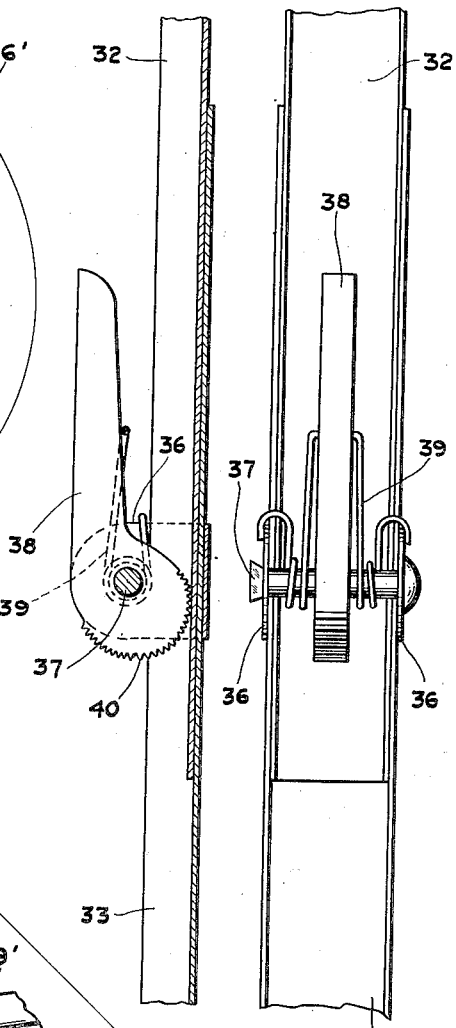
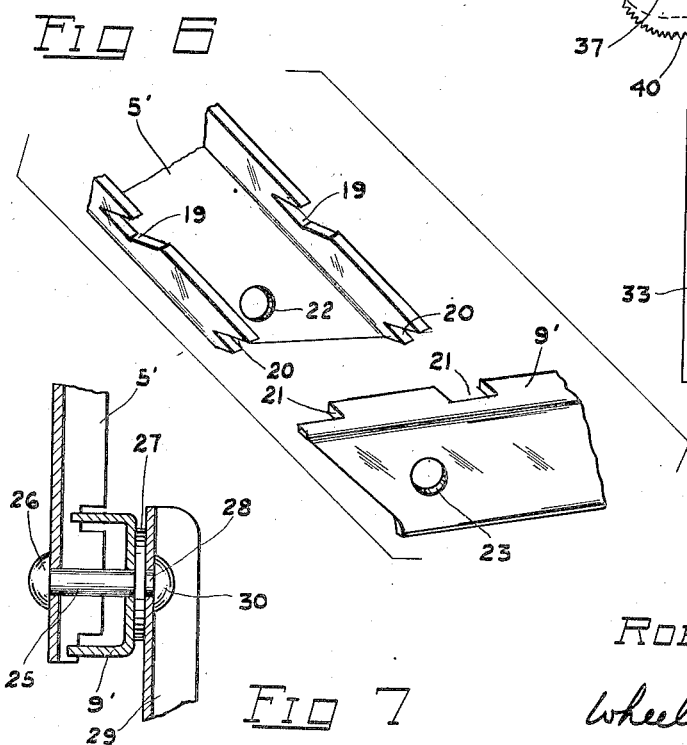
INVENTOR
ROBERT E. WOLF
Wheeler, Wheeler & Wheeler
ATTORNEYS Patented Nov. 27, 1951

2,576,868

UNITED STATES PATENT OFFICE 2,576,868

TRACTION ATTACHMENT FOR VEHICLE WHEELS

Robert E. Wolf, Waukesha, Wis.

Application August 3, 1946, Serial No. 688,177

6 Claims. (Cl. 152—228)

This invention relates to improvements in traction attachments for vehicle wheels.

It is the primary object of the invention to provide a traction attachment of simple, easily portable form which is easily applied to and removed from a vehicle wheel without tools even when such wheel is mired, without the necessity for jacking up the wheel, and which will provide excellent traction while affording smooth surfaces in contact with the pneumatic tire casing.

More specifically, it is my purpose to provide an appliance of the character described in which the individual traction elements comprise hooks connected in pairs to extend over the surfaces of a pneumatic casing, each pair of hooks and its connecting chordal member being unitary and having an adjustable connection with other like devices.

In the drawings:

Fig. 1 is a side elevation of my appliance as it appears in use.

Fig. 2 is an end elevation of the appliance as shown in Fig. 1.

Fig. 3 is a detail view taken on the section 3—3 of Fig. 1.

Fig. 4 is a fragmentary detail view partially in plan and partially in section showing one of the anchorage swivel pins.

Fig. 5 is a view similar to Fig. 1 showing a modified embodiment of the invention.

Fig. 6 is an enlarged detail view in perspective fragmentarily showing the component parts of the composite mud hook pairs shown in Fig. 5.

Fig. 7 is a fragmentary detail view on an enlarged scale taken on the line 7—7 of Fig. 5.

Fig. 8 is a fragmentary detail view showing in side elevation a quickly adjustable lock member for holding the pairs of hooks in place upon a tire.

Fig. 9 is a front view of the part shown in Fig. 8.

As shown in Fig. 1 the appliance comprises four mud hooks 5, 6, 7, 8 integrally connected in pairs and provided with means whereby the unitary pairs are mutually adjustable to and from tire casing engagement. The hooks 5 and 6 are integrally connected by a member 9 which extends across the tire casing on a minor chord thereof. The integrally connected hooks 5 and 6 and intervening member 9 comprise a unit preferably, although not necessarily, made of channel iron. The web 10 of the channel provides a flat lower surface engageable over a tire casing without damage thereto, while the upwardly projecting flanges 11 provide effective traction under all conditions. The unity and rigidity of the member which comprises the hooks 5 and 6 and the chordal element 9 assures the proper spacing of the hooks 5 and 6 and also facilitates the maintenance of its proper relationship to the other like unit which comprises hooks 7 and 8 integrally connected by a chordal member 12.

At or near the juncture of the respective chordal members 9 and 12 with the respective hooks, I provide swiveled studs 15 separately illustrated in Fig. 4. Each stud is provided with a threaded transverse bore at 16 to receive one of the link screws 17. Each of these screws has a righthand thread at one end and a lefthand thread at the other and each is preferably provided centrally with an operating handle at 18. Thus, the screws operate like turnbuckles to apply and release the respective mud hook units by drawing them simultaneously toward each other or forcing them simultaneously apart. The swivelling of the studs 15 accommodates any irregularity of relative movement as between the two screws 17, but it will be noted that the structure is so designed that when the screws are equally tightened, the traction device as a whole, in the preferred form illustrated, presents a parallelogram or preferably square frame comprising the members 9 and 12 and the screws 17. Thereby the several hooks 5, 6, 7 and 8 will be uniformly spaced at 90° from each other, each being approximately radial of the tire and disposed on a projected diagonal of the square frame aforesaid.

The chordal members 9 may conveniently be connected by welding or otherwise to the respective mud hooks instead of being made integral therewith. Where the parts are prefabricated and assembled, a convenient structure is that shown in Figs. 5, 6 and 7 where the mud hooks 5', 6' are notched at 19, 20 and the chordal member 9' has its flanges complementarily notched as at 21. Registering apertures 22, 23 receive the rivet 25 which is headed at 26, 27 to hold these parts together and has an extension at 28 which provides the fulcrum for link 29 and is upset at 30 to secure such link in place.

The mud hooks 7', 8' and chordal member 12' are similarly fabricated and assembled and anchored to the link 29.

Instead of using two adjustable links of the turnbuckle type, as shown in Figs. 1 and 2, I may employ some other form of adjustable link or I may employ one adjustable link and one link of fixed length, such as that shown at 29. As a suggestion for an alternative form of adjustable link, I have shown a pair of channels 32, 33 which are telescopically slidable upon each other and pivotally connected at 34, 35 with the respective mud hook assemblies. Connected with the link member 33 which is outermost in the telescopic organization is a yoke 36 supporting a rod 37 upon which the cam lever 38 is pivoted. The torsion spring 39 biases the cam lever for oscillation counterclockwise as viewed in Fig. 8 whereby its eccentric knurled margin 40 frictionally engages the link element 32. Any relative movement of link 32 respecting the yoke and link 33 in a direction to shorten the combined length of elements 32 and 33 will readily be accommodated by the cam lever 38 which will yield against the bias of spring 39. But any relative movement between elements 32 and 33 in a direction to increase their combined length will tend to oscillate the cam in a direction to bring into play a peripheral portion of larger radius, thereby wedging elements 32 and 33 together and precluding relative movement. Yet relative movement in a direction of separation is effected with the greatest ease if the lever 38 is manually depressed before the parts 32 and 33 are separated.

It will, of course, be understood that extension links of the general type shown in Figs. 8 and 9 may be substituted for the turnbuckles of Fig. 1 or one such turnbuckle screw may be replaced by a fixed link 29 and the other with some other form of adjustable link. It will also be understood that the integral mud hook assemblies shown in Fig. 1 and the fabricated assemblies of Figs. 5, 6 and 7 are interchangeable.

Either arrangement may be handled with great facility and applied or removed without the use of tools, without jacking up the vehicle wheel. In the case of the adjustable link shown in Figs. 5, 8 and 9, the operator need take no particular pains to fasten the device tightly to the wheel as the pressure developed by the weight of the wheel in the course of its rotation will telescopically collapse link element 32 within link element 33 and the cam lever will automatically secure the parts in telescopically adjusted minimum length to hold the hooks securely to the periphery of the tire.

The advantage of the fabricated assembly shown in Figs. 5 to 7 lies in the fact that, if desired, the immediate hooks may be made of hardened steel and the chordal members of mild steel. Various combinations of the features disclosed are possible within the scope of the invention.

I claim:

1. A plurality of traction devices for a vehicle wheel, each comprising unitarily a plurality of hooks and a member connecting said hooks for unitary handling, and adjustable means connecting said devices comprising a pair of telescopically slidable elements and a manually releasable cam lever mounted to one of said elements and engageable with the other in the direction in which said last element moves in extension for locking said elements in slidable connection, and means biasing said cam lever toward a position of locking engagement, whereby said elements are locked in each telescoped position to which they are thrust.

2. In a traction device, the sub-combination which comprises a pair of spaced mud hooks adapted for transverse engagement about a pneumatic tire casing at peripherally spaced points, and a rigid chordal member unitary with said hooks spanning the tire portion therebetween, the said hooks and member comprising separately fabricated parts and means substantially rigidly connecting said parts and including notched portions of the respective parts mutually interlocked with each other.

3. In a traction device, the sub-combination which comprises a pair of spaced mud hooks adapted for transverse engagement about a pneumatic tire casing at peripherally spaced points, and a rigid chordal member unitary with said hooks spanning the tire portion therebetween, said hooks and member comprising separately fabricated parts having notched flanges in mutually interlocking engagement, rivets welded to engage said parts and secure them in such engagement and having extensions beyond said parts, and link means pivotally mounted on said rivets for the connection of such sub-combination device with a like device.

4. In a traction device for vehicle wheels, a first mud hook unit comprising a pair of spaced radial mud hooks disposed substantially at 90 degrees with reference to each other and having a chordal member in substantially rigid connection with corresponding ends and extending obliquely therebetween, the opposite corresponding ends of said hooks being free, a second unit substantially identical with the first unit and having its mud hooks diametrically opposite the mud hooks of the first unit, and link means pivotally connecting the respective units, at least one of said link means being adjustable as to length and comprising a pair of telescopically slidable link elements, a yoke mounted on the outer of said elements, a cam lever carried by the yoke for pivotal movement and having an eccentric peripheral portion engageable with the inner of said elements, and means biasing said cam lever toward such engagement.

5. In a traction device for vehicle tires, a pair of mud hook units each comprising two hooks at approximately 90° respecting each other and a member in substantially rigid connection with the outer ends of the hooks, and adjustable tension means connected between said members for drawing the units toward each other to engage the hooks with the periphery of a tire casing, each hook comprising a channel having a web portion providing a smooth, tire engaging surface and marginal flanges projecting outwardly to engage a road surface traversed by the tire, the members having inwardly projecting flanges interlocked with flanges of the respective hooks and for which the hook flanges are notched.

6. In combination, a plurality of traction devices for a vehicle wheel, each such device comprising unitarily a plurality of substantially radial hooks engageable transversely over the periphery of a vehicle wheel and a member unitarily connecting said hooks and to which each hook is rigidly attached at one end, its other end being free, and means connecting said devices and adjustable for bodily moving said devices centrally of said wheel for securing them thereon, the means connecting said devices comprising one link in pivotal connection with each of said devices and a second link having portions each in pivotal connection with a separate one of said devices and relatively adjustable with respect to each other, said portions comprising telescopically slidable channels having nested flanges and cam means mounted on one channel and engageable with the other between said flanges for locking said elements in relatively adjusted position.

ROBERT E. WOLF.

REFERENCES CITED

The following references are of record in the file of this patent:

UNITED STATES PATENTS

| Number | Name | Date |
|---|---|---|
| 1,001,633 | Gaylor | Aug. 29, 1911 |
| 1,139,304 | Lyon | May 11, 1915 |
| 1,370,293 | Dowell | Mar. 1, 1921 |
| 1,936,323 | Bowen | Nov. 21, 1933 |
| 2,315,838 | Bryon | Apr. 6, 1943 |
| 2,445,913 | Grosjean | July 27, 1948 |

FOREIGN PATENTS

| Number | Country | Date |
|---|---|---|
| 830,563 | France | Aug. 3, 1938 |